Nov. 27, 1923.
E. L. ELLIOTT
LENS FOR VEHICLE LAMPS
Filed March 18, 1922
1,475,806
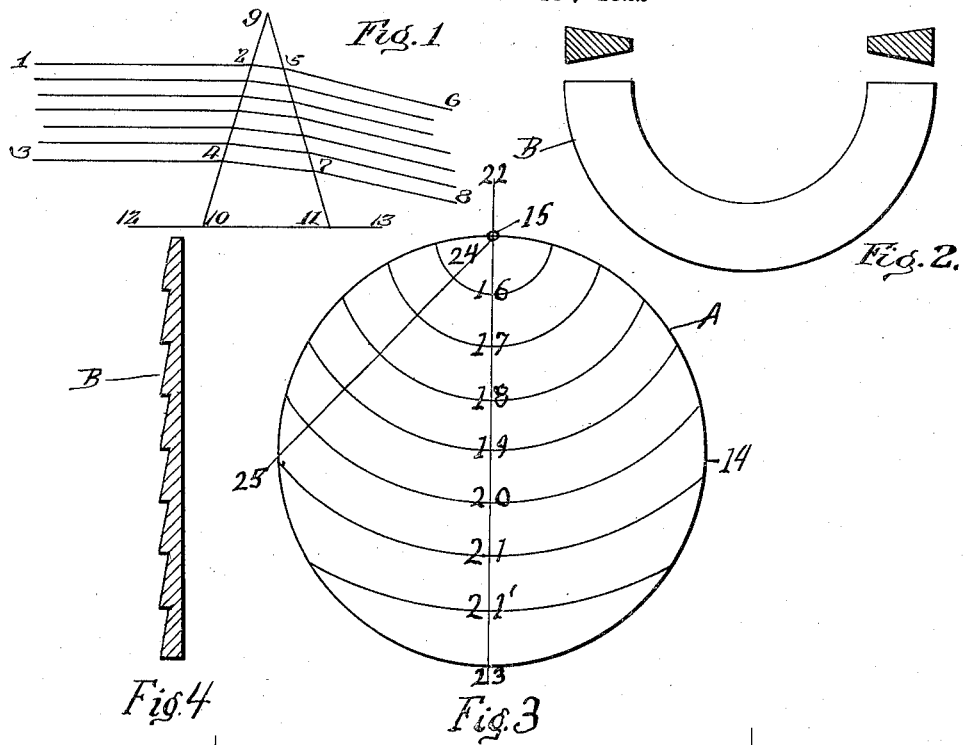
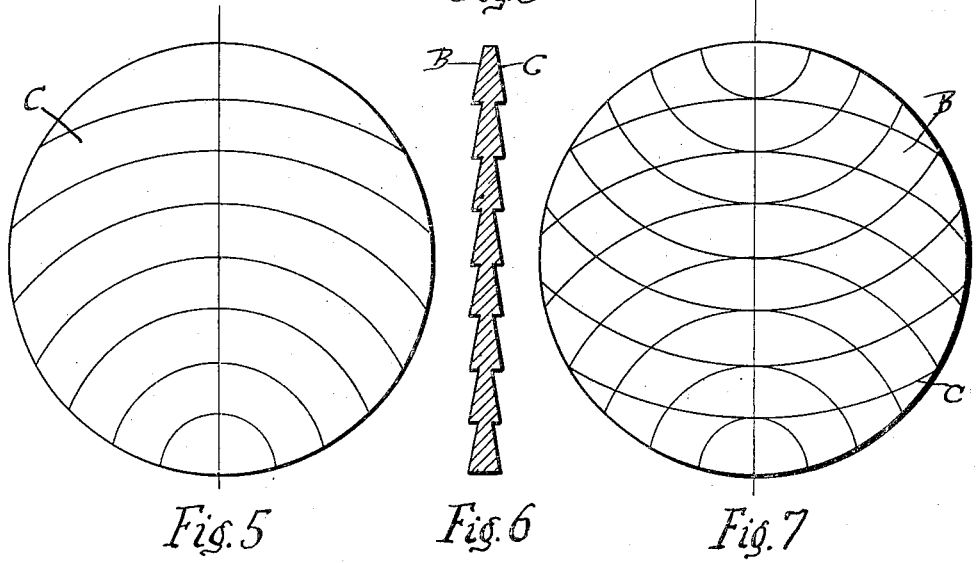
Fig.1  Fig.2.  Fig.3  Fig.4  Fig.5  Fig.6  Fig.7
Elias L. Elliott
Inventor Patented Nov. 27, 1923.

1,475,806

UNITED STATES PATENT OFFICE.

ELIAS L. ELLIOTT, OF NEW YORK, N. Y.

LENS FOR VEHICLE LAMPS.

Application filed March 18, 1922. Serial No. 544,929.

*To all whom it may concern:*

Be it known that I, ELIAS L. ELLIOTT, a citizen of the United States, and resident of New York city, county of New York, State of New York, have invented certain new and useful Improvements in Lenses for Vehicle Lamps, of which the following is a specification.

This invention relates to the type of lens used to modify the beam given out by vehicle lamps, with special reference to the headlights used on automobiles, and involves certain novel methods of applying the laws of physical optics to the construction of lenses of this type, as are clearly set forth in the description following. For the sake of clearness of explanation, I will refer to the automobile headlight, although my lens is not restricted to this particular use.

The automobile headlight is commonly designed to project a substantially parallel beam of light from a small electric lamp straight ahead of the car. By a slight variation in the position of the lamp, the beam may be made divergent, such divergence being uniform about the optical axis. Both of these forms of beams have serious practical defects,—so serious, in fact, that their public use is prohibited by law in many States. The parallel beam does not light the roadway around curves, nor reveal dangerous obstructions at the side, and gives a blinding glare when encountered by an approaching motorist, which renders him unfit for safe driving; and the divergent beam reduces the illumination on the roadway ahead, and increases proportionately the chance of throwing a dazzling light into the eyes of approaching drivers.

These two defects may be overcome by modifying the parallel beam in two ways; viz. (1) by spreading it out laterally, i. e. producing a divergent beam having a more or less elliptical cross section, with the major axis horizontal; and (2) by deflecting this beam downward at such an angle that the upper rays will not be above the level of the lamp. Such a beam will light the roadway with maximum brilliancy, while throwing sufficient light to either side to reveal ditches or obstructions, and to discover curves at such a distance before reaching them that they can be safely made, and approaching cars avoided. The downward deflection of the beam will prevent its meeting and dazzling the eyes of approaching drivers. My lens produces these two modifications of the approximately parallel beam of the automobile headlight as commonly constructed, by means which I will now proceed to describe, elucidating my description by reference to the accompanying drawings.

Fig. 1 is a diagram of a glass prism and the downward deflection of light beams when passed through the prism.

Fig. 2 is a representation of a prism bent into semicircular form showing portions in action.

Fig. 3 is a diagram of the curved prisms applied to a lens.

Fig. 4 shows a cross section of the lens taken on the line 24, 25, Fig. 3.

Fig. 5 is a diagram of the lens having curved prisms on its obverse side.

Fig. 6 is a cross section of a lens having the prisms on both sides.

Fig. 7 is a diagram of the prisms as they will appear on a transparent lens.

If a parallel beam be passed through a glass prism it will be deflected in a direction toward the base of the prism, according to the well known laws of optics, as shown in Fig. 1—1, 2, 3, 4, being the incident beam, and 5, 6, 7, 8 the emergent beam; 9, 10, 11 the prism, and 12, 13 the base line. It is obvious that if the prism has its base horizontal the beam will be deflected downward; if the base is vertical, the beam will be deflected laterally; and if the base be inclined at any angle between these two positions the deflection will be at a corresponding angle. If, now, the prism B be bent into a semi-annular form, as shown in Fig. 2, it follows that a parallel beam incident on this curved prism, and substantially normal to the plane of its curvature, will be deflected uniformly at all angles between the horizontal and vertical.

Having described the optical principle upon which my lens works, I will proceed to describe specifically the manner in which I utilize this principle in its design and construction. Referring to Fig. 3, I describe a circle, 14, of any desired diameter, and taking a point, 15, on this circle, which represents the top of the lens A when in use, I proceed to describe concentric circles, of any desired difference in radius, preferably differing by a constant, or uniformly varying amount, included within the circle, 14, as shown,—16, 17, 18, 19, 20, 21,—and so on until the area of the circle has been filled. These segments of concentric circles represent the apexes and bases of annular prisms B, as shown in Fig. 4, which represents a cross section of the lens in a vertical plane through the center of the lens and the common center of the concentric prisms, and normal to its general plane, intersecting it in the line 22—23.

Referring again to Fig. 3, and to the action of a curved prism as before described, it will be seen that all light passing through in this plane will be deflected downward. The light passing through in a plane intersecting the common center of the annular prisms, and at an angle of 45° from the vertical, 24—25, will be deflected both downward and outward; as it will likewise if passing through at any other angle between the horizontal and vertical. The amount of deflection in any case will depend upon the angles which the faces of the prisms make with the rays passing through, which may be any inclination up to the limiting angle of refraction. Angles at from 5° to 20° from the normal to the rays are sufficient for the purpose. The total result of such a lens is thus to deflect a parallel beam downward, and spread it laterally, which is the result it is desired to accomplish. The prisms B may also be given curved faces without departing from the general principles upon which my lens is constructed. Also, instead of the prisms having a common face on one side of the lens, so that the lens has one plane surface, as shown in Fig. 3, this obverse side may be formed into a similar series of concentric prisms C in the reverse order: i. e. with their common center of curvature at a point diametrically opposite that of the prisms on the other side and with their faces inclined in an opposite direction with reference to the center. This face of the lens will then appear as shown in Fig. 5, and a cross section through the lens in the vertical plane will appear as in Fig. 6.

As the conformation of both surfaces will be visible in the transparent glass, such a lens will have the appearance shown in Fig. 7. This lens will possess the additional advantage of reducing glare by breaking up the beam to some extent into a series of small beams: i. e. there will be some diffusion as compared with a parallel beam. The principles of construction which I have described lend themselves readily to the methods of glass pressing in general use.

What I claim is:

A lens for vehicle headlights having one face formed into concentric prisms whose common center is at or near the top of the lens, and whose bases are respectively at the ends of their radii, and the opposite face formed into concentric prisms whose common center is at or near the bottom of the lens, and whose apexes are respectively at the ends of their radii.

Signed at New York, in the county of New York and State of New York, this 17th day of March, A. D. 1922.

ELIAS L. ELLIOTT.

Witnesses:
  WM. J. MILLER,
  P. McGARTY.